US009268407B1

(12) United States Patent
Noble (10) Patent No.: US 9,268,407 B1
(45) Date of Patent: Feb. 23, 2016

(54) INTERFACE ELEMENTS FOR MANAGING GESTURE CONTROL (71) Applicant: Amazon Technologies, Inc., Reno, NV (US)

(72) Inventor: Isaac S. Noble, Soquel, CA (US)

(73) Assignee: Amazon Technologies, Inc., Reno, NV (US)

( * ) Notice: Subject to any disclaimer, the term of this patent is extended or adjusted under 35 U.S.C. 154(b) by 142 days.

(21) Appl. No.: 13/649,005

(22) Filed: Oct. 10, 2012

(51) Int. Cl.
*G06F 3/048* (2013.01)
*G06F 3/01* (2006.01)

(52) U.S. Cl.
CPC ............... *G06F 3/017* (2013.01); *G06F 3/011* (2013.01)

(58) Field of Classification Search
None
See application file for complete search history.

(56) References Cited

U.S. PATENT DOCUMENTS

| | | | | |
|---|---|---|---|---|
| 2003/0142068 A1* | 7/2003 | DeLuca | ................. | G02B 27/22 345/156 |
| 2009/0079813 A1* | 3/2009 | Hildreth | ................. | H04N 7/147 348/14.03 |
| 2009/0259964 A1* | 10/2009 | Davidson et al. | ............. | 715/788 |
| 2010/0040292 A1* | 2/2010 | Clarkson | ............ | G06K 9/00355 382/201 |
| 2010/0066676 A1* | 3/2010 | Kramer | ................... | G06F 3/017 345/158 |
| 2010/0164891 A1* | 7/2010 | Hill | ........................ | G06F 3/0421 345/173 |
| 2010/0188423 A1* | 7/2010 | Ikeda et al. | .................... | 345/659 |
| 2010/0199232 A1* | 8/2010 | Mistry | ..................... | G06F 1/163 715/863 |
| 2011/0063224 A1* | 3/2011 | Vexo | ...................... | G06F 3/0489 345/168 |
| 2011/0310050 A1* | 12/2011 | Chiang | ......................... | 345/174 |
| 2012/0089348 A1* | 4/2012 | Perlin | ..................... | G06F 3/005 702/41 |
| 2012/0092286 A1* | 4/2012 | O'Prey | .................. | G06F 3/0416 345/174 |
| 2012/0151421 A1* | 6/2012 | Clarkson | ................. | G06F 3/017 715/863 |
| 2013/0296057 A1* | 11/2013 | Gagner | ................... | G06F 3/017 463/37 |

* cited by examiner

Primary Examiner — Matt Kim
Assistant Examiner — Hua Lu
(74) Attorney, Agent, or Firm — Novak Druce Connolly Bove + Quigg LLP (57) ABSTRACT

Approaches are described for enabling a user to utilize fingers or other features of both hands to interact with an interface on an electronic device. A user can hold an device such as a mobile phone in a first hand, and can use a finger of the other hand to navigate through an interface or other display, such as to move relative to the device to cause the interface to scroll, zoom, or otherwise adjust. The user can use a thumb or finger of the hand holding the device to select or interact with one or more user-selectable elements, objects, or portions of the interface displayed on a display element of the device, such as by touching the screen over one of the user-selectable elements for at least a determined period of time to activate or change a function associated with a gesture used to interact with the interface.

22 Claims, 7 Drawing Sheets

INTERFACE ELEMENTS FOR MANAGING GESTURE CONTROL

BACKGROUND

As computing devices offer increasing processing capacity and functionality, users are able to provide input in an expanding variety of ways. For example, a user might be able to control a computing device by performing a motion or gesture at a distance from the computing device, where that gesture is performed using a hand or finger of the user. In some instances, however, it can be difficult for a computing device to determine the intent of the gesture, as a user might want to move a finger to scroll to a location to select an item, or zoom into an item, but the software on the computing device can have difficulty distinguishing the motions for each of these gestures. This can be frustrating for a user when the user has to repeat a gesture several times or perform different gestures to obtain the desired result.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for providing input to an electronic device. In particular, various embodiments discussed herein enable a user to utilize fingertips, or various other features or objects, to interact with an interface on an electronic device. In at least some embodiments, a user can hold a device such as a phone in a first hand, and can use a fingertip of the other hand to navigate through an interface or other display, such as to move relative to the device to cause the interface to scroll, zoom, or otherwise adjust. The fingertip can be at least a distance from the device, and can be imaged using one or more camera or other sensor(s) of the device.

The user can use a thumb or finger of the first hand holding the device to select or interact with one or more user-selectable elements, objects, or portions of the interface displayed on a display element of the device, such as by touching the screen at a location associated with one of the user-selectable elements for at least a determined period of time to activate or change a function or other action associated with a gesture (e.g., an air gesture) used to interact with the interface. For example, each user-selectable element can enable an associated function when selected, and when one of the user-selectable elements is selected, movement of the fingertip can be tracked to determine at least one of a gesture or motion being performed, where the gesture or motion can cause the associated action to be performed at least during the time the user-selectable element is selected.

Various other functions and advantages are described and suggested below as may be provided in accordance with the various embodiments.

Figure 1:
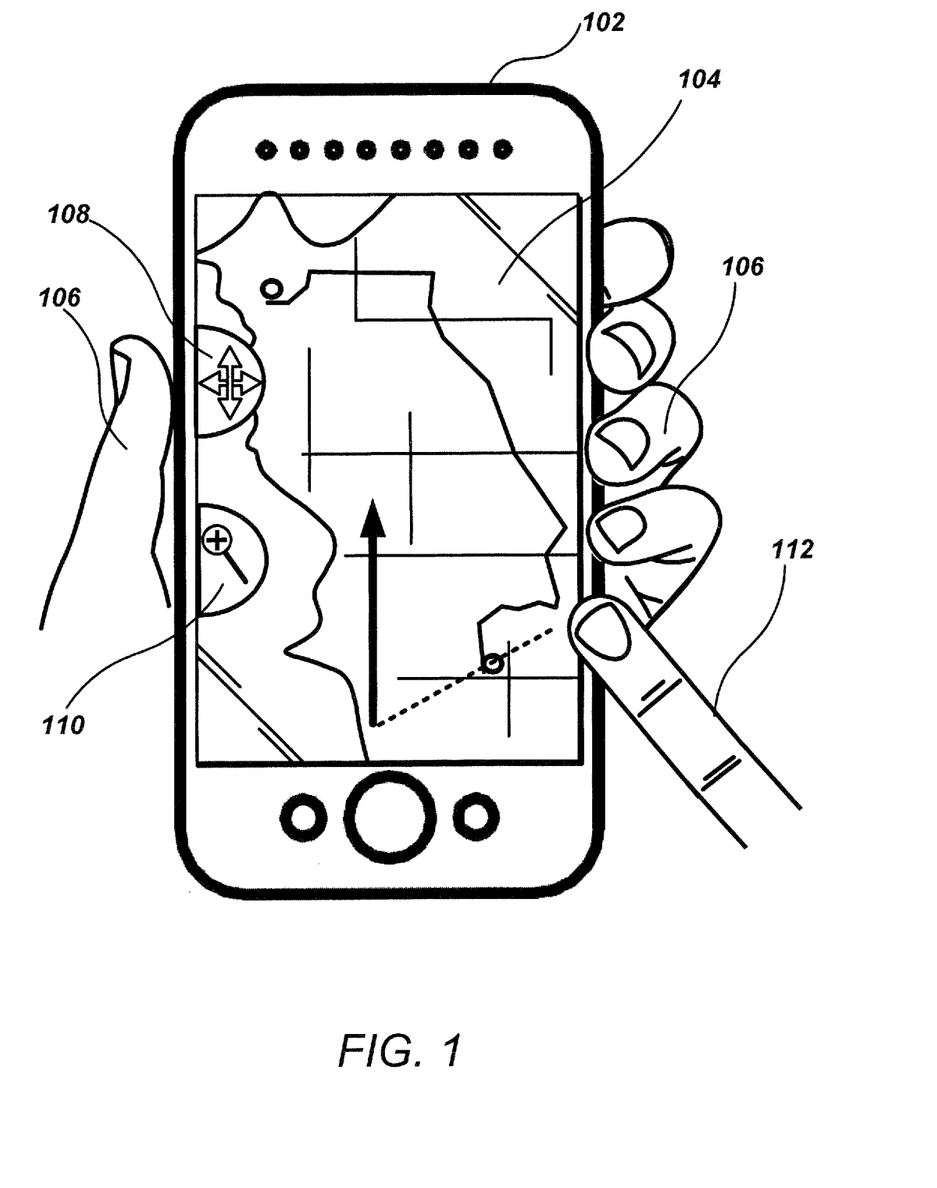
FIG. 1 illustrates an example implementation where a user holding a computing device is interacting with a graphical user interface (GUI) of the computing device, in accordance with an embodiment.

FIG. 1 illustrates an example situation wherein a user is interacting with a graphical user interface (GUI) 104 rendered on a display screen of a computing device 102. Although a portable computing device (e.g., an electronic book reader, smart phone, or table computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, and portable players, among others.

In this example, the user is holding the computing device 102 in one of the user's hands. If the user wants to navigate through the interface 104 (i.e., a two-dimensional or three-dimensional interface) using a conventional approach, the user would typically touch the screen of the device 102 and swipe the user's thumb or other finger in a specific direction in order to scroll or otherwise navigate the displayed portion of the interface 104 to be able to view the desired content.

In at least some embodiments, the user can hold the device 102 in a first hand 106, and can use a fingertip 112 of the other hand to navigate through the interface 104, such as to move relative to the computing device 102 to cause the interface to scroll, zoom, or otherwise adjust. In this way, the user's fingertip 112 can be used to perform gestures, that when interpreted by the device 102, can cause the interface 104 to scroll, zoom, or otherwise adjust. However, such approaches can result in the user inadvertently changing the state of the interface 104 when trying to scroll, among other such options. For example, a user must move a finger (e.g., finger 112) towards the display screen to select an object, which can be misinterpreted as a navigation or zoom option. Further, use of motions can cause the device 102 to confuse a zoom with a navigation input. For example, a user might attempt to zoom in or out on an object such as an image or map interface by creating a gesture with the hovering fingertip 112, but the gesture can be misinterpreted by the device 102, and can cause the device 102 to instead perform a different function such as panning or scrolling.

Accordingly, approaches in accordance with various embodiments utilize a dual- or multi-input approach that can overcome at least some of these issues to provide a greater level of control and accuracy over an interface rendered on a computing device. In at least some embodiments, the computing device 102 can enable a user to utilize motions or gestures at a distance from the device in order to control navigation actions created by hover interactions to scroll or zoom, among other such actions. At the same time, the device can utilize a touch input to change the event or any function associated with the hover interaction. This can enable a user to perform a different action such as panning between tabs in a browser, changing information displayed when panning over links, navigating or otherwise interacting with the interface input, upon the device receiving the touch input and interpreting the hover interaction. These approaches complement each other, and enable a user to more accurately and quickly navigate an interface, particularly for an interface of a small, portable computing device such as a smart phone or portable media player.

For example, as shown in FIG. 1, a user is able to utilize a feature or object, such as a fingertip 112 of the hand not holding the device, to move laterally with respect to the display screen of the computing device 102 in order to scroll or otherwise update the display of the interface on the computing device. In this example, the finger 112 is positioned at an appropriate distance from the computing device 102 in order to provide input to the device. The finger can then be moved in a direction that is approximately parallel to the screen of the computing device 102 and towards the top of the computing device 102, which can cause the interface 104 rendered on the computing device to scroll in an upward direction, to display a second portion of the interface on the display screen. The user can use any appropriate motion to navigate through the interface 104, such as to move right or left to scroll, flip, or otherwise change to a portion of the interface 104 logically to the right or left of the currently displayed portion. Similarly motions can be made for other interface motions as well, such as to move up and down, diagonally, etc. In at least some embodiment the distance at which the fingertip 112 is held from the device can control a zoom level of at least a portion of the interface or objects of the interface displayed on the device. For example, a user can move the fingertip closer to the device to "zoom in" on an object, or cause that object to be expanded on the display screen of the device. Similarly, the user can pull the fingertip away from the device to zoom out, among other such actions.

As discussed, conventional motion approaches would require a user to also use the fingertip 112 to select an object on the screen by moving the fingertip towards the display screen. However, this could cause confusion with a zoom action, and moving the fingertip all the way to the screen can have some lateral motion which can inadvertently end up in the user selecting the wrong object on the interface, or panning across the interface.

Accordingly, approaches in accordance with various embodiments can enable the user to interact with the interface 104 of the device 102 to enable additional actions or functions that can be used to navigate the interface. For example, as shown in FIG. 1, a user is able to use a thumb or other finger of the hand holding the computing device 102 to select one of two user-selectable elements (108, 110), objects, or portions of the interface displayed on the computing device. The user can select one of the user-selectable elements by contacting a corresponding location on a touch-sensitive display screen, for example, or in at least some embodiments can "hover" or hold the thumb for a period of time over that portion of the screen by contacting the screen, in order to select that user-selectable elements\. Such an approach can enable a user to navigate with one hand (the free hand), and make selections with the other (e.g., a touch selection), which can provide a greater level of control and accuracy with respect to interaction with the interface.

For example, user-selectable element 108 can be associated with a panning event and user-selectable element 110 can be associated with a zooming event, where the user-selectable elements can include a graphical indication or other representation that can indicate to a user the event or function associated with the user-selectable element. The interface 104 can display a map application or any other application, and a user can utilize a hover interaction such as a gesture (e.g., an air gesture) in order to control navigation actions at the interface. When a selection action, a touch input, or the user otherwise selects one of the user-selectable graphical user interface (GUI) elements by contacting or holding the thumb for a period of time over that portion of the interface is received at one of the user-selectable elements (108, 110), the event associated with the hover interaction can be changed to the event associated with the user-selectable element receiving the touch input. For example, in the case where user-selectable element 108 is selected, the computing device can enable a user to utilize a hover interaction (such as an air gesture) to pan the interface 104. When the user-selectable element 110 is selected, the computing device can change the event associated with the hover interaction from panning to zooming.

In accordance with an embodiment, the event or function associated with a user-selectable element can be active as long as the user-selectable element is selected or is otherwise receiving a continuous interaction. When the user-selectable element is no longer being selected, the event associated with the user-selectable element, and invoke by the hover interaction, returns to a default event or another event. Alternatively, in accordance with an embodiment, selecting a user-selectable element can toggle the event associated with the user-selectable element on or off. For example, a first interaction at a user-selectable element can toggle on the event associated with the user-selectable element, where a user can utilize a hover interaction to implement the event associated with the user-selectable element without having to continuously interact with the user-selectable element. A second interaction at the same user-selectable element (or a different user-selectable element) can toggle off the event associated with the user-selectable element.

It should be noted that although two user-selectable elements are shown, more or fewer user-selectable elements that can change an event associated with a hover interaction are possible. It should be further noted that the user-selectable elements do not have to be user-active areas, objects, or elements a display screen that can receive and cause a computing device to perform an action. In accordance with various embodiments, one or more physical buttons can be placed on or around the computing device and can be used to change the event associated with a hover interaction. In some embodiments, a graphical indication such as an arrow or other graphical indication can be used to indicate to a user the availability of the physical buttons, along with a graphical indication that can indicate the function or event associated with the physical button. Additionally or alternatively, various alternative arrangements within the scope of the embodiments described herein can be used to change the event associated with a hover interaction, as will be evident to one or ordinary skill in the art, such as shaking the device, holding the device in a certain orientation, receiving a voice activation input, etc.

In accordance with an embodiment, the computing device can attempt to orientate the user-selectable elements relative to the user's thumb or other finger of the hand holding the device. For example, the computing device can attempt to locate a point such as the base of the user's index finger or any finger of the hand not holding the device, and use information about the shape and/or size of the user's hand, as well as the orientation of the hand, to attempt to estimate whether the user's hand not holding the device is a left or right hand. Based on this information, the computing device can position the user-selectable elements near or around the thumb or other fingers of the hand holding the device. Additionally or alternatively, the device can store profile information of a user of the device that indicates orientation information such as, e.g., whether the user holds the device with their left or right hand, and this information can be used to position the user-selectable elements near the thumb or other finger of the hand holding the device.

Figure 2A:
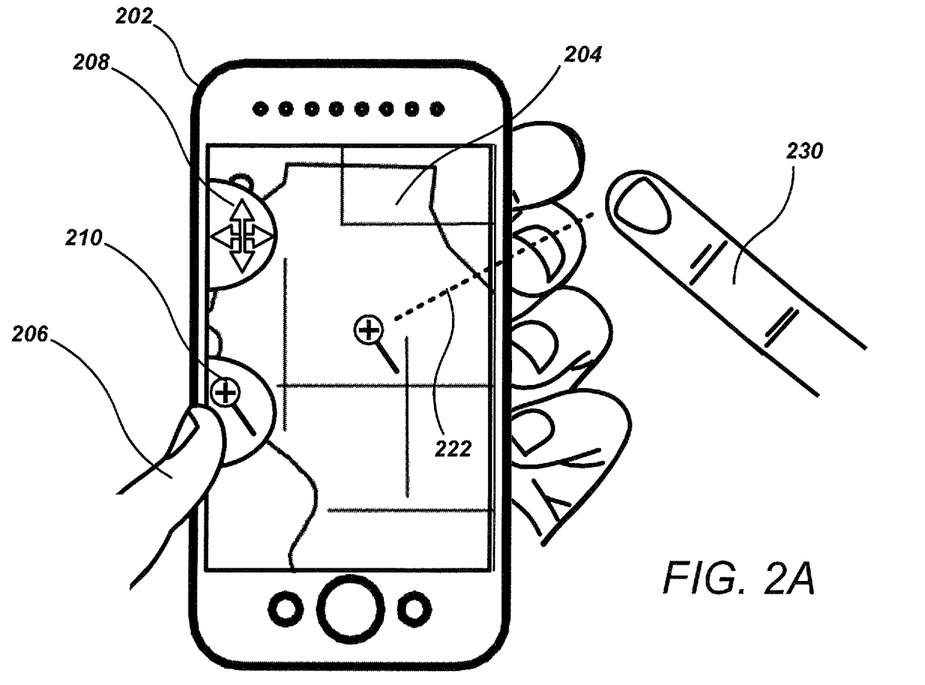
FIGS. 2A-2B illustrate example implementations where a user holding a computing device is interacting with a graphical user interface (GUI) of the computing device, in accordance with an alternative embodiment.

FIG. 2A illustrates an example situation in which a user is able to user a fingertip or other such object (e.g., an object held by the user) to zoom into specific objects (such as a map display) rendered as part of a display screen. As shown in FIG. 2A, a user is holding a computing device 202 in one hand and has positioned a finger 230 of the other hand with respect to the map display rendered on an interface 204, display screen or other display element of the computing device. As discussed above, the user can move the finger 230 closer to and/or further away from the computing device 202 at that lateral location in order to zoom in or zoom out on the object. In some embodiments, however, the user may want to pan or otherwise perform a different action on the display screen. In a traditional zoom approach, the map area currently displayed would be enlarged, but the user would not be able to pan or otherwise see other portions of that map without performing an additional gesture or motion that, as described above, may get misinterpreted by the device.

In accordance with an embodiment, a user is able to activate actions used to interact with the display screen using a different approach. For example, as shown in FIG. 2A, a user is able to use a thumb 206 or other finger of the hand holding the computing device 202 to select user-selectable element 210 displayed on an interface of the computing device. The user can select user-selectable element 210 by contacting a corresponding location on the interface, and in this example, the user-selectable element 210 can be associated with a zooming event. The user-selectable element 210 can include a graphical indication or other representation that can indicate to a user the event or function associated with the user-selectable element.

In this example, the user can utilize a hover interaction such as a gesture in order to control navigation actions at the display screen. When a selection action or touch input (or a user otherwise selects the user-selectable element by contacting or holding the thumb for a period of time over that portion of the interface) is received at user-selectable element 210, the event associated with the gesture can be changed to the event associated with the user-selectable element receiving the touch input. For example, in the case where user-selectable element 210 is selected, the computing device can enable a user to utilize a hover interaction 222 to zoom in and out of the display screen 204.

For example, a user can move the finger 230 closer to the computing device to "zoom in" on the, or cause that object to be expanded on the display screen of the device. Similarly, the user can pull the finger away from the computing device to zoom out, among other such actions. In accordance with various embodiments, other movements can be used to zoom in and out of the display screen when the user-selectable element 210 is selected. For example, the computing device 202 can be configured to zoom in when the device detects the finger moving to the user's right, or when the computing device detects that the finger 230 is moving to the top of the computing device. In any situation, while user-selectable element 210 is selected, gestures or other movements can cause the map displayed on the display screen to be zoomed in or out of.

After zooming in and out of the display screen, a user may want to scroll, pan or otherwise navigate the map area. In this case, the user's finger 230 can be used to perform gestures, that when interpreted by the device, can cause the display screen to pan, scroll or otherwise navigate the display screen. However, such approaches can result in the user inadvertently changing the state of the display when trying to pan, among other such options. For example, a user might attempt to pan or scroll around the map area by creating a gesture with the hovering finger, but the gesture can be misinterpreted by the device, and can cause the device to instead perform a different action such as zooming in or out of the map image.

Figure 2B:
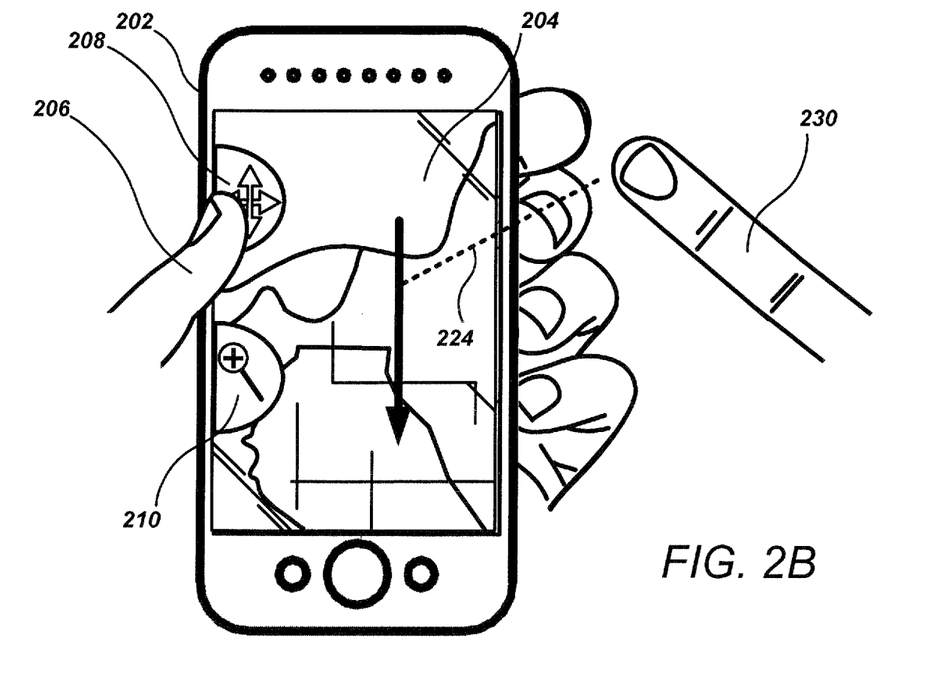

In accordance with an embodiment, as shown in FIG. 2B, the user is able to use a thumb 206 of the hand holding the computing device 202 to select user-selectable element 208 displayed on the display screen 204 of the computing device 202 to change the event associated with the hover interaction from zooming to panning. For example, when the user-selectable element 208 is selected, the finger 230 can be used to pan or scroll at least a portion of the display screen or objects of the display screen. For example, the user can use a finger 230 of the hand not holding the device, to move laterally 224 with respect to the display screen of the computing device in order to scroll or otherwise update a display of a GUI on the computing device. In this example, the finger 230 can be moved in a direction that is approximately parallel to the display screen of the computing device and towards the bottom of the computing device, which can cause the interface rendered on the computing device to scroll in a downward direction, to display a second portion of the interface on the display screen. The user can use any appropriate motion to navigate through the interface, such as to move right or left to scroll, flip, or otherwise change to a portion of the interface logically to the right or left of the currently displayed portion.

It should be noted that although the example shown illustrates the use of user-selectable elements, objects, or portions of an interface displayed on the computing device to change or otherwise alter a function generated by detecting a gesture or motion of a tracked finger for a map application, the various embodiments described herein are not limited to this particular arrangement. Various alternative applications can be used within the scope of the embodiments described herein, as will be evident to one or ordinary skill in the art.

For example, the device can utilize a touch input at certain user-selectable elements to change an event associated with a hover interaction to enable a user to perform a different action upon receiving the touch input for other applications, such as a web browser where the actions can include panning between tabs, changing the information displayed when panning over links; a remote control application for media; a stock ticker application; a gallery application; a weather application; a news application; etc. For example, a forward motion of a fingertip relative to the computing device can be detected, and upon determining that a user has selected the user-selectable element, a first function can be performed by the computing device to adjust a zoom level of an image (e.g., a map or other image) being displayed on a display screen of the computing device. Upon determining that the user has not selected the user-selectable element, a second function can be performed by the computing device to select an object or other area of the image being displayed on the display screen of the computing device.

In another example where the computing device is being used to play a media track, the computing device can detect a wave of a hand of the user in a left to right direction or right to left direction relative to the computing device, and can, in response to detecting the wave of the hand, skip the media track playing. Additionally, upon detecting a selection action of a graphical element or other user-selectable element, the computing device can, in response to detecting the wave of the hand, scrub within the media track playing.

Figure 3:
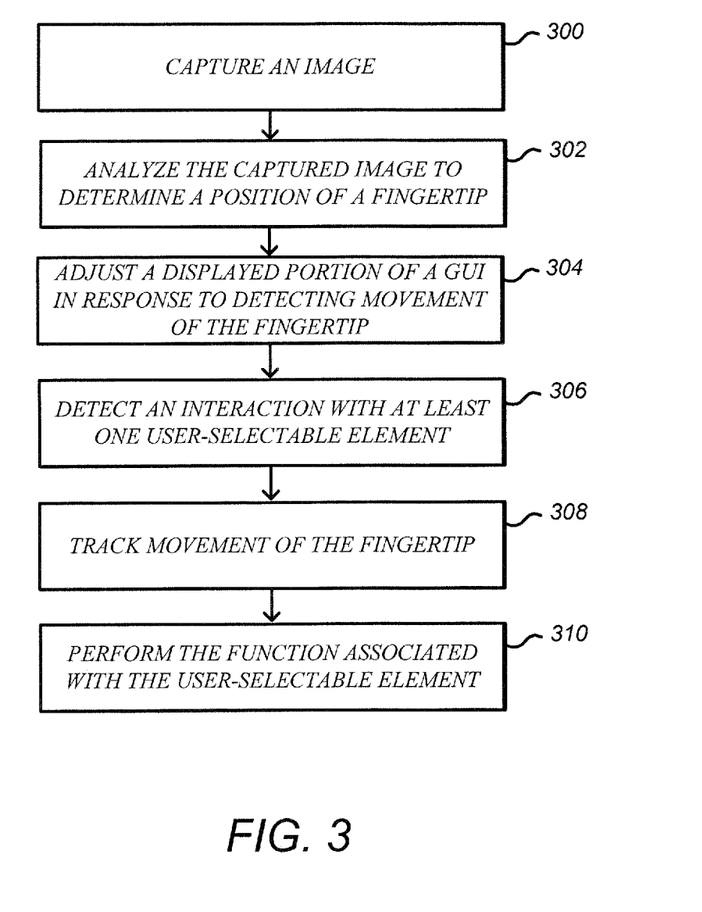
FIG. 3 illustrates an example process for determining user input, in accordance with various embodiments.

FIG. 3 illustrates an example process for determining user input, in accordance with various embodiments. It should be understood that, for any, process described herein, that there can be additional or fewer steps performed in similar or alternative orders, or in parallel, within the scope of the various embodiments unless otherwise stated. At step 300, an image is captured using at least one camera of a computing device, where the device can be held by a user. At step 302, the captured image is analyzed to determine a position of a first fingertip of the user with respect to a display screen of a computing device, where the first fingertip is located at a distance from the display screen. It should be noted that other technologies, such as capacitive detection or ultrasonic detection, can be used to determine the location of a feature or object as well within the scope of the various embodiments.

At step 304, a displayed portion of a graphical user interface (GUI) displayed on the display screen is adjusted in response to detecting movement of the first fingertip, where the movement is detected at least in part by analyzing additional images captured by the at least one camera. For example, the user can utilize the first fingertip of the hand not holding the device to move laterally with respect to the display screen of the computing device in order to scroll or otherwise update the display of the interface on the computing device. In this manner, when the first fingertip is moved in a direction that is approximately parallel to the screen of the computing device and towards the top of the computing device, the interface rendered on the computing device can be scrolled in an upward direction, to display a second portion of the interface on the display screen.

In accordance with an embodiment, the GUI can include at least one user-selectable element (i.e., a user selectable GUI element or other selectable GUI element) that enables a second function, action or otherwise causes the interface to be adjusted when selected. For example, one user-selectable element can be associated with a panning function and another user-selectable element can be associated with a zooming function, where the user-selectable elements can include a graphical indication or other representation that can indicate to a user the event or function associated with the user-selectable element. The interface can display a map application or any other application that a user can interact with.

At step 306, a selection action being performed by a second fingertip with respect to the at least one user-selectable element is detected, where the user can select one of the user-selectable elements by contacting a corresponding location on a touch-sensitive display screen, for example, or in at least some embodiments can "hover" or hold the thumb for a period of time on the user-selectable element. When the selection action (e.g., a touch input) is received at one of the user-selectable elements, the current function associated with the hover interaction can be changed to the function associated with the user-selectable element receiving the touch input. For example, in the case where user-selectable element is selected, the computing device can enable a user to utilize a hover interaction to pan the interface. Alternatively, when another user-selectable element is selected, the computing device can change the event associated with the hover interaction from panning to zooming.

At step 308, movement of the first fingertip is tracked over time to determine at least one of a gesture or motion being performed by the user. At step 310, the second function associated with the user-selectable element is performed, instead of the first function or action, when the gesture and the selection action is detected. For example, in the instance where the function associated with the user-selectable element causes the interface to pan, and the that user-selectable element is selected, the user can use any appropriate motion to pan through the interface, such as to move right or left to scroll, flip, or otherwise change to a portion of the interface logically to the right or left of the currently displayed portion. If the user no longer selects the user-selectable element, or selects a different user-selectable element, the default function or the function associated the user-selectable element receiving the touch input can be used when a gesture is received at the device.

Figure 4:
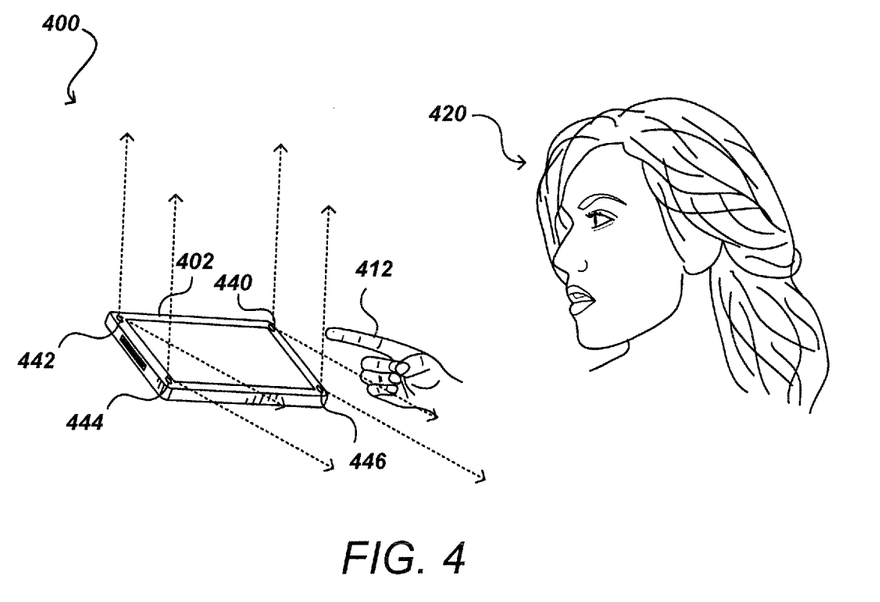
FIG. 4 illustrates an example situation where a user is interacting with a computing device, in accordance with various embodiments.

FIG. 4 illustrates an example environment 400 in which aspects of the various embodiments can be implemented. In this example, a user 420 is attempting to provide gesture input to a computing device 402 using the user's finger 412. In this example, the computing device 402 includes four cameras 440, 442, 444, 446 or other gesture sensors, configured to capture images including at least one view of the user's finger 412, which can be analyzed by an application executing on (or in communication with) the computing device to determine a relative location of the finger 412 to the computing device 402. The images can include still image or video data captured using ambient or infrared light, among other such options. Further, fewer or additional cameras of the same or different types can be used as well within the scope of the various embodiments. The application can determine the position of the finger, and can track the position of the finger over time by analyzing the captured image information, in order to allow for motion and/or gesture input to the device. For example, the user can move the finger up and down to adjust a volume, move the finger in a plane to control a virtual cursor, and the like. Multiple fingers and other objects or features can be tracked as well within the scope of the various embodiments.

Figure 5:
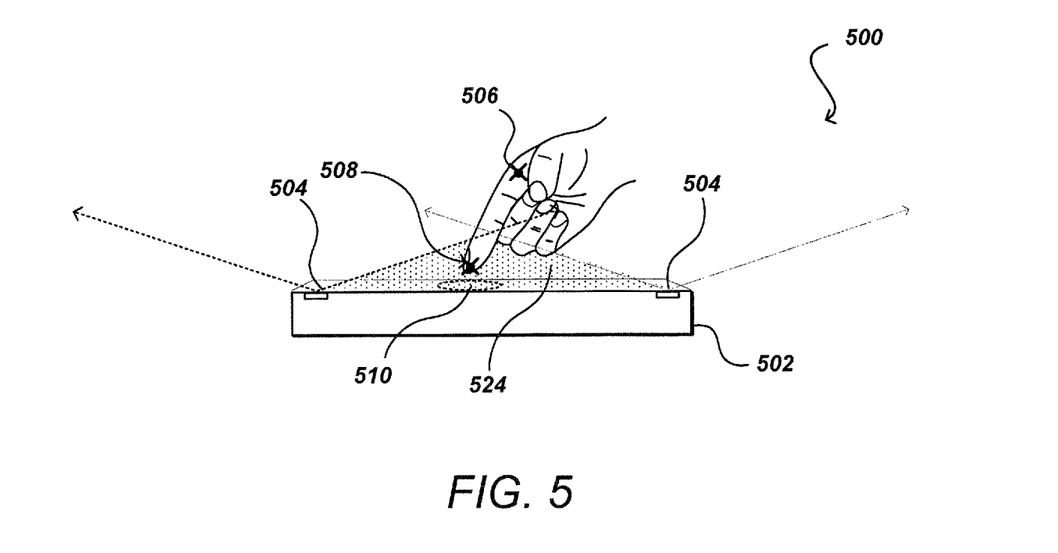
FIG. 5 illustrates an example situation where the approximate location of a fingertip of a user can be determined using images captured of a portion of a user's hand, in accordance with various embodiments.

As illustrated in the example situation 500 of FIG. 5, however, relying on image data alone may not be sufficient to track a fingertip or other object over a full range of motion. In this example, the finger of the user passes outside the fields of view of the two cameras 504 shown on a device 502, passing into what is referred to herein as a "dead zone" 524 between the fields of view. As illustrated, a portion of the finger is within the field of view but the fingertip has passed into the dead zone. An approach in accordance with various embodiments can attempt to estimate the position of the fingertip based at least in part upon the portion of the finger or hand that is viewable in the field of view. For example, the device can attempt to locate a point 506 such as the base of the user's index finger, and use information about the shape and/or size of the user's hand, as well as the orientation of the hand, to attempt to estimate the location of the fingertip 508 within a region of uncertainty 510, where the size of the region of uncertainty can be based upon factors such as how much of the finger is visible in the field of view of at least one camera and the orientation of the finger.

Figure 6A:
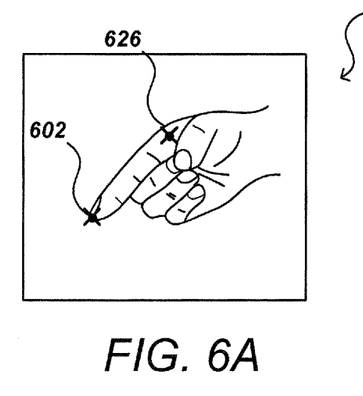
FIGS. 6A-6B illustrate example images that can be captured using a pair of cameras, in accordance with various embodiments.
Figure 6B:
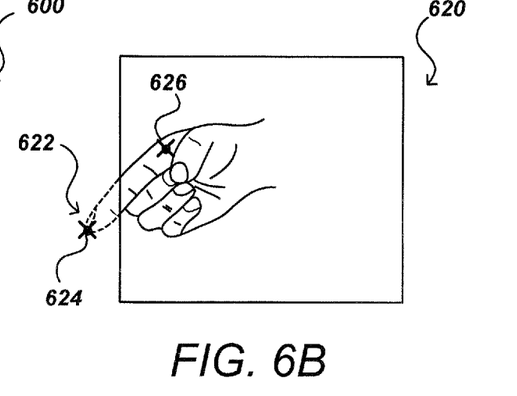

FIG. 6A illustrates an example image 600 that could be captured by one of the cameras of a computing device. In this example image, the hand of the user can clearly be seen. An application executing on the computing device (or at least in communication with the computing device) can analyze the image to locate the fingertip 602 and determine, based at least in part upon information known about the position and configuration of the camera, a relative position of the fingertip 602 with respect to the computing device. As discussed, however, relying on camera information can have certain drawbacks as each camera will generally have a limited field of view. Even fisheye or other wide-angle lenses have limited fields of view, or at least provide somewhat distorted images near the edge of the field of view. Accordingly, there will generally be one or more dead zones around the computing device where an object might fall outside the field of view of any of the cameras. For example, the image 620 of FIG. 6B illustrates a view from the same camera when the hand has moved towards the center of the device. As illustrated, the fingertip 622 has moved outside the field of view, and thus is not contained in the image, such that the device is unable to determine a point or position 624 corresponding to the fingertip location. Unless the fingertip entered the field of view of another camera, the device cannot view the fingertip in images captured from any of the cameras at that location.

In this example, the computing device can still see a portion of the hand, and using pattern recognition, image recognition, object recognition, or another such process can potentially still identify a portion, such as the finger base location 626, of the user's hand in the image 620. In at least some embodiments, the device can attempt to estimate, using statistical analysis or otherwise, the position of the user's fingertip using the visible portion of the user's hand. For example, if the device was able to view the user's fingertip at a point in the recent past and was able to determine the relative distance and direction of the fingertip to the base point 626, the device can use an extrapolation process to estimate that the fingertip point 624 is likely in a similar relative location. The device can track changes in the relative distance and orientation between the fingertip and base points, and can use these to estimate the location when at least one of those points falls outside the viewable area of at least one camera of the device. As discussed, the estimate will typically have some uncertainty or error, such that the estimate essentially corresponds to a region of probability, where the fingertip is likely contained within that region. The size and/or shape of the region can be based upon factors such as the distance from the device, the amount of the finger that can be seen in an image, the shape and size of the user's finger, the orientation of the hand and/or finger, and other such information.

In another embodiment, a computing device might store, or otherwise have access to, a model of the user's hand. Using information such as the size, shape, and relative configuration of the hand from the image information, the device can use the model to estimate the location of the fingertip. Based at least in part upon the model and the base point 626, physical limitations of the user's finger and hand will mean that the fingertip position is limited to a determinable range of locations. Using information such as the visible portion of the finger and the orientation of the hand, the device can further limit the potential region and, if a location can be determined with a reasonable amount of certainty or variation, that point can be used as the fingertip location 624. Various other such estimation approaches can be used as well within the scope of the various embodiments.

Figure 7:
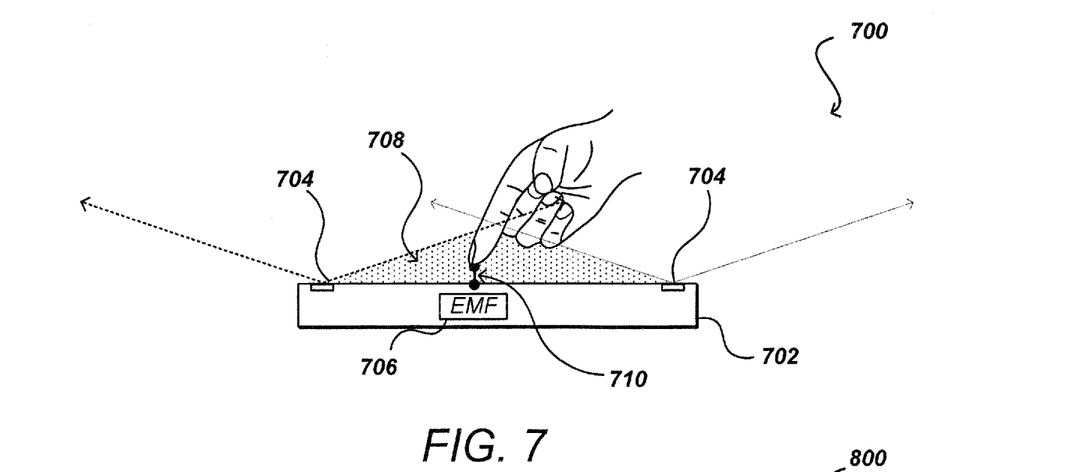
FIG. 7 illustrates an example situation where the location of a fingertip of a user can be determined using an electromagnetic field-based approach in accordance with various embodiments.

In at least some embodiments, a computing device might include one or more other types of sensors or components that can assist with fingertip location determinations in accordance with various embodiments. For example, FIG. 7 illustrates an example configuration 700 wherein a computing device includes a touch screen that is able to detect objects in contact with, or within a detectable distance of, the touch screen. The touch screen assembly can include at least one device sensor, in this example an electromagnetic field (EMF) sensor 706 (e.g., an EMF meter or EMF probe), operable to detect changes in an electromagnetic field resulting from a nearby object. The EMF sensor in this example can be any appropriate sensor, probe, meter, or other such element, operable to measure changes in EMF using broadband measurements, frequency-selective measurements, or any other such EMF-based approach. Similar other devices can be used as well, as can include mutual-capacitance and self-capacitance detection systems, or ultrasonic position detection sensors, for example, which determine the location of an object by detecting changes in capacitance near specific locations of the touch screen. Each of these technologies can detect an object such as a fingertip at a distance from the device, such that the position 710 of the fingertip with respect to the device 702 can be determined even when the fingertip is in the dead zone 708 between the fields of view of at least two cameras 704 on the device.

Figure 8:
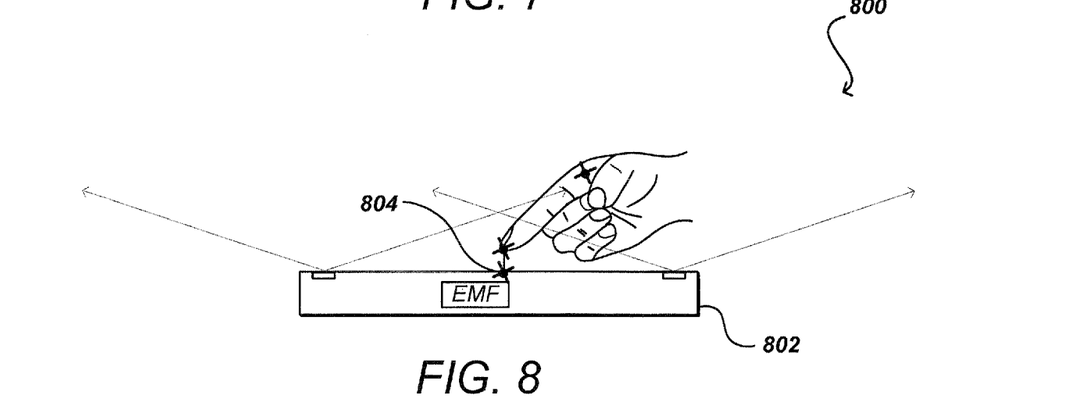
FIG. 8 illustrates an example situation where image and electromagnetic field (EMF) determinations can be used together to improve location determinations in accordance with various embodiments.

In this example, the range of the EMF extends over at least a majority of the dead zone 708, and in at least some embodiments can partially extend beyond the dead zone in order to provide more accurate and continuous determinations. As the tip of the user's finger moves towards the dead zone, the EMF sensor can detect a change in the field, which can be used to estimate a relative position 710 of the closest point of the fingertip in three dimensions. Approaches for locating an object based on changes in the electromagnetic field are known in the art and as such will not be discussed in detail herein. As illustrated in the example configuration 800 of FIG. 8, the position information from the EMF sensor can be combined with the information obtained from images captured by the cameras, and analyzed to attempt to determine an estimated position, in order to provide a more accurate determination of the fingertip position 804 with respect to the device 802.

Figure 9:
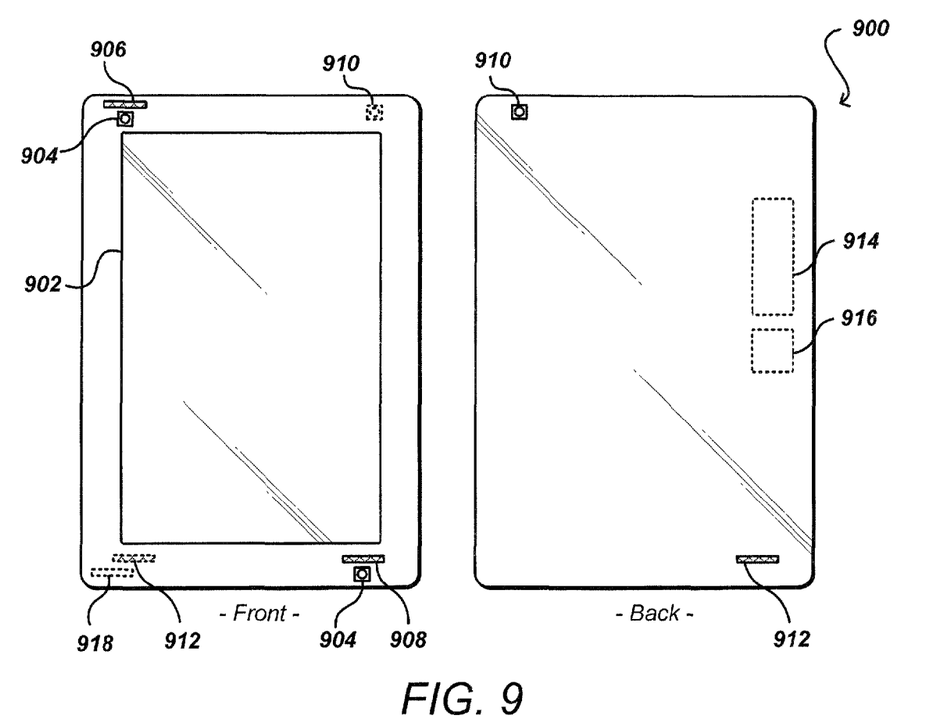
FIG. 9 illustrates front and back views of an example portable computing device that can be used in accordance with various embodiments.

FIG. 9 illustrates front and back views of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display element of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
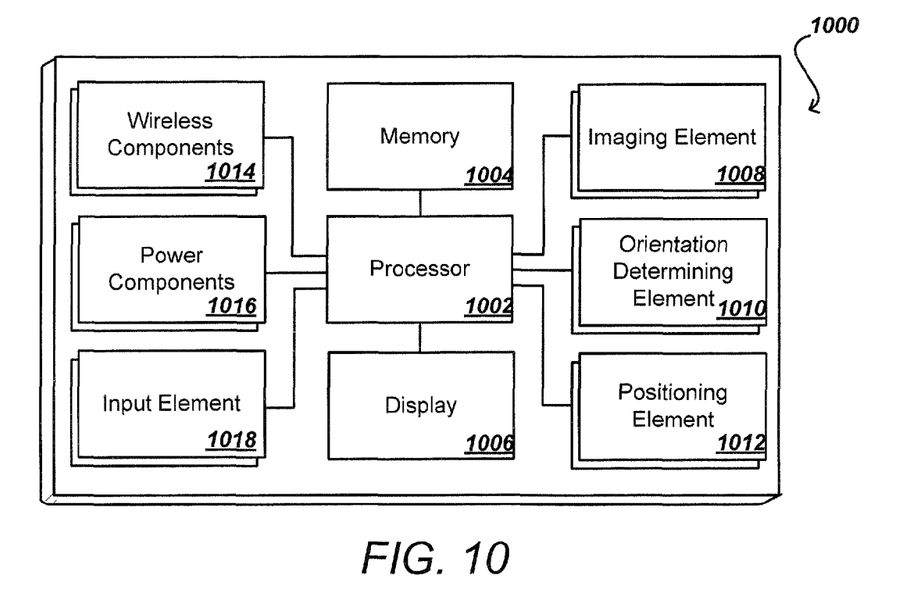
FIG. 10 illustrates an example set of basic components of a portable computing device, such as the device described with respect to FIG. 9.

FIG. 10 illustrates a set of basic components of an electronic computing device 1000 such as the device 900 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 11:
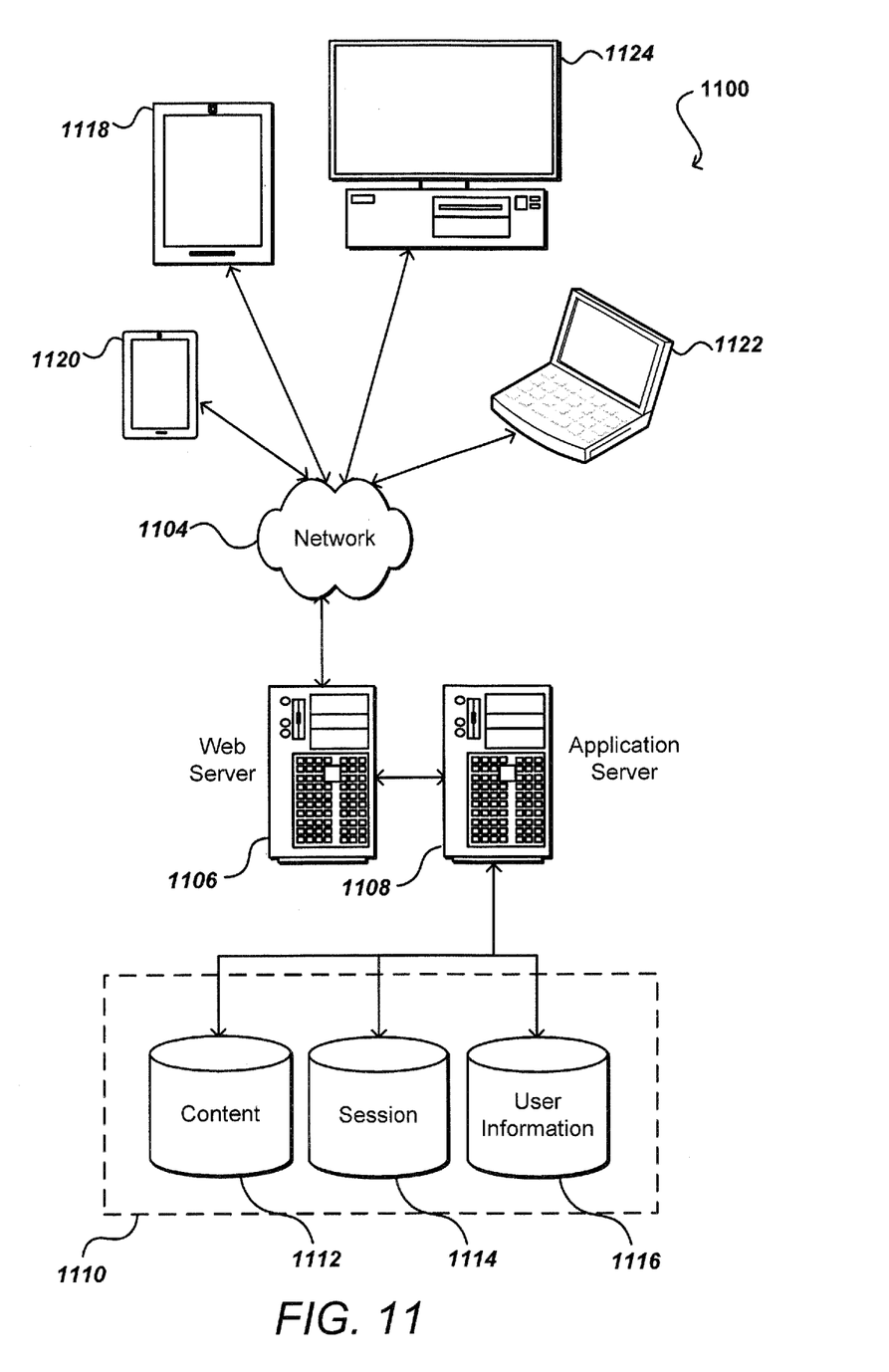
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes electronic client devices 1118, 1120, 1122, and 1124, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client devices 1118, 1120, 1122, and 1124 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1118, 1120, 1122 and 1124. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not, limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for determining an input to a mobile computing device, the method comprising:
under control of one or more computer systems configured with executable instructions,
determining, based at least in part on analyzing image information, movement of a fingertip with respect to a display of the mobile computing device;
determining an air gesture based at least in part on the movement of the fingertip becoming closer in distance to the computing device;
determining a selection status of a selectable element of the mobile computing device;
using the selection status to identify a selected navigation action type from a plurality of available navigation action types;
interpreting the air gesture to control a navigation action according to the selected navigation action type; and
determining a zoom level of an image being displayed on the display screen, the zoom level based at least in part on the air gesture.

2. The computer implemented method of claim 1, wherein the selectable element comprises a selectable graphical user interface element displayed on the display, the method further comprising:

determining, using a sensor on the mobile computing device, at least one position of at least one finger of a hand that is holding the mobile computing device; and positioning the selectable GUI element on the display screen of the mobile computing device based at least in part on the at least one position.

3. The computer implemented method of claim 1, wherein the selectable element is a graphical user interface element displayed on a display of the mobile computing device.

4. The computer implemented method of claim 1, wherein the selected air gesture navigation action type is one of zooming navigation action or scrolling navigation action and wherein the air gesture navigation action is one of zooming or scrolling.

5. A computer implemented method, comprising:
   detecting a selection action of a graphical element displayed on a display screen of a computing device, the selection action causing a navigation function to be enabled during a time the selection action is selected;
   capturing image information, during the time the selection action is enabled, using a sensor of the computing device;
   analyzing the image information to determine a gesture input to the computing device; and
   utilizing the gesture input to control the navigation function during the time the selection action is being performed;
   detecting a second selection action of a second graphical element displayed on the display screen, the second graphical element being associated with a second function;
   enabling the second function;
   detecting a second gesture input during a time the second selection action is selected; and
   causing, the second function to be performed, wherein the second function is configured to cause at least one of scrolling, zooming, or changing to another displayed portion.

6. The computer implemented method of claim 5, further comprising:
   analyzing the image information to detect at least one position of a fingertip with respect to the computing device;
   determining the at least one position of the fingertip with respect to the computing device by analyzing the image information to locate a representation of the fingertip; and
   positioning the graphical element on a graphical user interface (GUI) of the computing device based at least in part on the at least one position.

7. The computer implemented method of claim 6, wherein the fingertip is on a hand of the user that is not holding the computing device.

8. The computer implemented method of claim 5, further comprising:
   detecting a media track being played on the computing device;
   determining a wave of a hand of a user of the computing device in one of a left to right direction or a right to left direction relative the computing device, the wave of the hand corresponding to the gesture input;
   causing the computing device to skip the media track being played on the computing device based at least in part on the gesture input.

9. The computer implemented method of claim 5, wherein the graphical element provides a graphical representation of the navigation function that is to be enabled when the selection action is detected.

10. The computer implemented method of claim 5, further comprising:
    detecting the gesture input using camera information from at least one camera of a computing device, the gesture being performed within a detection range of the at least one camera,
    detecting a change in orientation of the computing device using at least one of an accelerometer, an electronic compass, an inertial sensor, and an electronic gyroscope;
    displaying the graphical element on a display screen of the computing device within a threshold distance to at least one finger of a hand of a user holding the computing device.

11. A computing system, comprising:
    at least one processor; and
    memory including instructions that, when executed by the at least one processor, cause the computing system to:
       detect a selection action of a graphical element displayed on a display screen of a computing device, the selection action causing a navigation function to be enabled during a time the selection action is selected;
       capture image information, during the time the selection action is enabled, using a sensor of the computing device;
       analyze the image information to determine a gesture input to the computing device; and
       utilize the gesture input to control the navigation function during the time the selection action is being performed;
       detect a second selection action of a second graphical element displayed on the display screen, the second graphical element being associated with a second function;
       enable the second function;
       detect a second gesture input during a time the second selection action is selected; and
       cause, the second function to be performed, wherein the second function is configured to cause the computing device to adjust a displayed portion of a display element by at least one of scrolling the displayed portion, zooming the displayed portion, or changing to display another portion of the displayed portion.

12. The computing system of claim 11, wherein the instructions when executed further cause the system to:
    analyze the image information to detect at least one position of a fingertip with respect to the computing device;
    determine the at least one position of the fingertip with respect to the computing device by analyzing the image information to locate a representation of the fingertip; and
    position the graphical element on a graphical user interface (GUI) of the computing device based at least in part on the at least one position.

13. The computing system of claim 11, further comprising:
a capacitive sensor configured to sense a change in capacitance near a display screen of the computing device, wherein detecting the selection action includes analyzing a change in capacitance of the capacitive sensor.

14. The computing system of claim 11, wherein the graphical element provides a graphical representation of the function that is to be enabled when the selection action is detected.

15. The computing system of claim 11, wherein the instructions, when executed, further cause the system to:

detect the gesture input using camera information from at least one camera of a computing device, the gesture being performed within a detection range of the at least one camera, detect a change in orientation of the computing device using at least one of an accelerometer, an electronic compass, an inertial sensor, and an electronic gyroscope;

display the graphical element on a display screen of the computing device within a threshold distance to at least one finger of a hand of a user holding the computing device.

16. The computing system of claim 11, wherein the instructions, when executed, further cause the computing device to:
   detect the selection action no longer being performed; and
   disable the navigation function.

17. The computing system of claim 11, wherein the instructions, when executed, further cause the computing device to:
   determine, using at least one sensor on a computing device, at least one position of at least one finger of a hand of a user that is holding the computing device; and
   position the graphical element on a displayed portion of the computing device based at least in part on the at least one position.

18. A non-transitory computer readable storage medium storing one or more sequences of instructions executable by one or more processors to perform a set of operations comprising:
   detecting a selection action of a graphical element displayed on a display screen of a computing device, the selection action causing a navigation function to be enabled during a time the selection action is selected;
   capturing image information, during the time the selection action is enabled, using a sensor of the computing device;
   analyzing the image information to determine a gesture input to the computing device; and
   utilizing the gesture input to control the navigation function during the time the selection action is being performed;
   detecting a second selection action of a second graphical element displayed on the display screen, the second graphical element being associated with a second function;
   enabling the second function;
   detecting a second gesture input during a time the second selection action is selected; and
   causing, the second function to be performed, wherein the second function is configured to cause the computing device to adjust a displayed portion of a display element including at least one of scrolling the displayed portion, zooming the displayed portion, or changing to display another portion of the displayed portion.

19. The non-transitory computer readable storage medium of claim 18, further comprising instructions executed by the one or more processors to perform the operations of:
   analyzing the image information to detect at least one position of a fingertip with respect to the computing device;
   determining the at least one position of the fingertip with respect to the computing device by analyzing the image information to locate a representation of the fingertip; and
   positioning the graphical element on a graphical user interface (GUI) of the computing device based at least in part on the at least one position.

20. The non-transitory computer readable storage medium of claim 18, wherein detecting the selection action includes analyzing a change in capacitance of a capacitive element associated with a display screen of the computing device.

21. The non-transitory computer readable storage medium of claim 20, wherein the fingertip is on a hand of a user that is not holding the computing device, and wherein the selection action is a touch selection action.

22. The non-transitory computer readable storage medium of claim 18, further comprising instructions executed by the one or more processors to perform the operations of:
   detecting the selection action no longer being performed; and
   disabling the navigation function.

\* \* \* \* \*